US012585321B2

(12) United States Patent
Natarajan et al.

(10) Patent No.: US 12,585,321 B2
(45) Date of Patent: Mar. 24, 2026

(54) USB POWER SAVING PROTOCOL AND CONTROLLER

(71) Applicant: Intel Corporation, Santa Clara, CA (US)

(72) Inventors: Udaya Natarajan, El Dorado Hills, CA (US); Kannappan Rajaraman, Bangalore (IN); Karthi Vadivelu, Folsom, CA (US); Hem Doshi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 18/617,755

(22) Filed: Mar. 27, 2024

(65) Prior Publication Data

US 2025/0306666 A1      Oct. 2, 2025

(51) Int. Cl.
*G06F 1/3234* (2019.01)
*G06F 13/38* (2006.01)
*G06F 13/42* (2006.01)

(52) U.S. Cl.
CPC .......... *G06F 1/3253* (2013.01); *G06F 13/385* (2013.01); *G06F 13/4282* (2013.01); *G06F 2213/0042* (2013.01)

(58) Field of Classification Search
CPC .... G06F 1/3237; G06F 1/3253; G06F 1/3287; G06F 13/4063; G06F 13/4068; G06F 13/4081; G06F 13/4282; G06F 2213/0042; G06F 13/385
See application file for complete search history.

(56) References Cited

U.S. PATENT DOCUMENTS

| | | | | |
|---|---|---|---|---|
| 8,972,621 B1 * | 3/2015 | Raza | ...................... | G06F 13/385 710/316 |
| 12,004,062 B2 * | 6/2024 | Peng | ...................... | H04W 12/60 |
| 2011/0016346 A1 * | 1/2011 | Lee | ........................... | G06F 1/12 713/503 |
| 2012/0060045 A1 * | 3/2012 | Foster | ....................... | G06F 1/12 713/400 |

(Continued)

OTHER PUBLICATIONS

"Universal Serial Bus 3.1 Specification". Revision 1.0. Hewlett-Packard Company et al. Jul. 26, 2013. (Year: 2013).*

*Primary Examiner* — Thomas J. Cleary
(74) *Attorney, Agent, or Firm* — Viering, Jentschura & Partner mbB

(57) ABSTRACT

Disclosed herein are systems, devices, and apparatuses for a USB protocol. The USB system includes a communication interface that is configurable to communicate in a first universal serial bus (USB) communication mode or a second USB communication mode. The USB system also includes a processor configurable to send receiver detection signals to a peripheral device over the communication interface to determine whether the peripheral device is capable of communicating in the first USB communication mode, wherein the processor is configured to send an initial signal of the receiver detection signals to the peripheral device and, if a response to the initial signal of the receiver detection signals indicates that the peripheral device is incapable of operating in the first USB communication mode, refrain from sending subsequent ones of the receiver detection signals.

18 Claims, 8 Drawing Sheets

800

Sending an initial signal of receiver detection signals to a peripheral device ⤷810

If a response to the initial signal of the receiver detection signals indicates that the peripheral device is incapable of operating in a first USB communication mode (e.g., a USB 3 communication mode (e.g., SuperSpeed or SuperSpeed Plus)), refraining from sending subsequent ones of the receiver detection signals ⤷820

(56)                References Cited

U.S. PATENT DOCUMENTS

| | | | |
|---|---|---|---|
| 2012/0084594 A1* | 4/2012 | Chen | G06F 1/04 |
| | | | 713/501 |
| 2012/0210143 A1* | 8/2012 | Amemura | G06F 1/266 |
| | | | 713/300 |
| 2012/0290761 A1* | 11/2012 | Chen | G06F 13/4045 |
| | | | 710/305 |
| 2013/0166897 A1* | 6/2013 | Amemura | G06F 8/65 |
| | | | 713/2 |
| 2013/0185462 A1* | 7/2013 | Manabe | G06F 11/3051 |
| | | | 710/16 |
| 2013/0212306 A1* | 8/2013 | Liu | G06F 13/4068 |
| | | | 710/72 |
| 2014/0244872 A1* | 8/2014 | Goh | G06F 13/4286 |
| | | | 710/106 |
| 2014/0273856 A1* | 9/2014 | Kyles | H04W 76/28 |
| | | | 455/41.2 |
| 2014/0325097 A1* | 10/2014 | Manabe | G06F 13/4068 |
| | | | 710/16 |
| 2014/0365690 A1* | 12/2014 | Paramasivam | G06F 11/2247 |
| | | | 710/8 |
| 2015/0370751 A1* | 12/2015 | Perrine | G06F 13/385 |
| | | | 710/106 |
| 2016/0028250 A1* | 1/2016 | Patnaik | H02J 7/00 |
| | | | 710/16 |
| 2016/0147625 A1* | 5/2016 | Min | G06F 13/4022 |
| | | | 710/104 |
| 2016/0321210 A1* | 11/2016 | Baterina | G06F 13/385 |
| 2017/0046299 A1* | 2/2017 | Isaac | G06F 13/4282 |
| 2018/0205836 A1* | 7/2018 | Odagaki | H04N 1/00127 |
| 2019/0044785 A1* | 2/2019 | Vadivelu | G06F 13/4004 |
| 2023/0161723 A1* | 5/2023 | Kasichainula | G06F 13/382 |
| | | | 710/105 |
| 2023/0385218 A1* | 11/2023 | Natarajan | G06F 13/382 |
| 2024/0160256 A1* | 5/2024 | Gao | G06F 1/1658 |
| 2024/0303210 A1* | 9/2024 | Natarajan | G06F 13/4295 |
| 2024/0393858 A1* | 11/2024 | Dai | G06F 1/266 |
| 2024/0411469 A1* | 12/2024 | Jain | G06F 3/0673 |
| 2025/0086077 A1* | 3/2025 | Ben-Yehoshua | G06F 13/385 |

* cited by examiner

USB POWER SAVING PROTOCOL AND CONTROLLER

TECHNICAL FIELD

The disclosure relates generally to Universal Serial Bus (USB) systems, and in particular, to power savings in USB systems that may support multiple modes of operation and data transfer rates according to different generations and versions of the USB standards.

BACKGROUND

In general, the Universal Serial Bus (USB) standards define, among other items, a protocol for interfacing among computing devices and, in particular, connecting peripheral devices such as keyboards, mice, printers, storage device, etc. to a computing system and other electronic devices, allowing data transfer, power supply, and device communication through a single cable connection. The standard has evolved over time and several different versions of the standard define various cable/connector types and the protocols for communication, including, for example, USB 2.0, USB 3.1, USB 3.2, USB 3.3, and USB4. In addition, various interoperability interface standards have also been drafted to provide a common framework for controlling USB ports and devices. For example, the "eXstensible Host Controller Interface for Universal Serial Bus" specifies requirements for the register-level host controller interface for USB 2.0 and above (for short, the "xHCI" specification). xHCI includes a description of the hardware/software interface between system software and the host controller hardware. As the standards evolve, they may help provide interoperability and backwards compatibility, but this may also lead to inefficiencies, especially with respect to power consumption.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
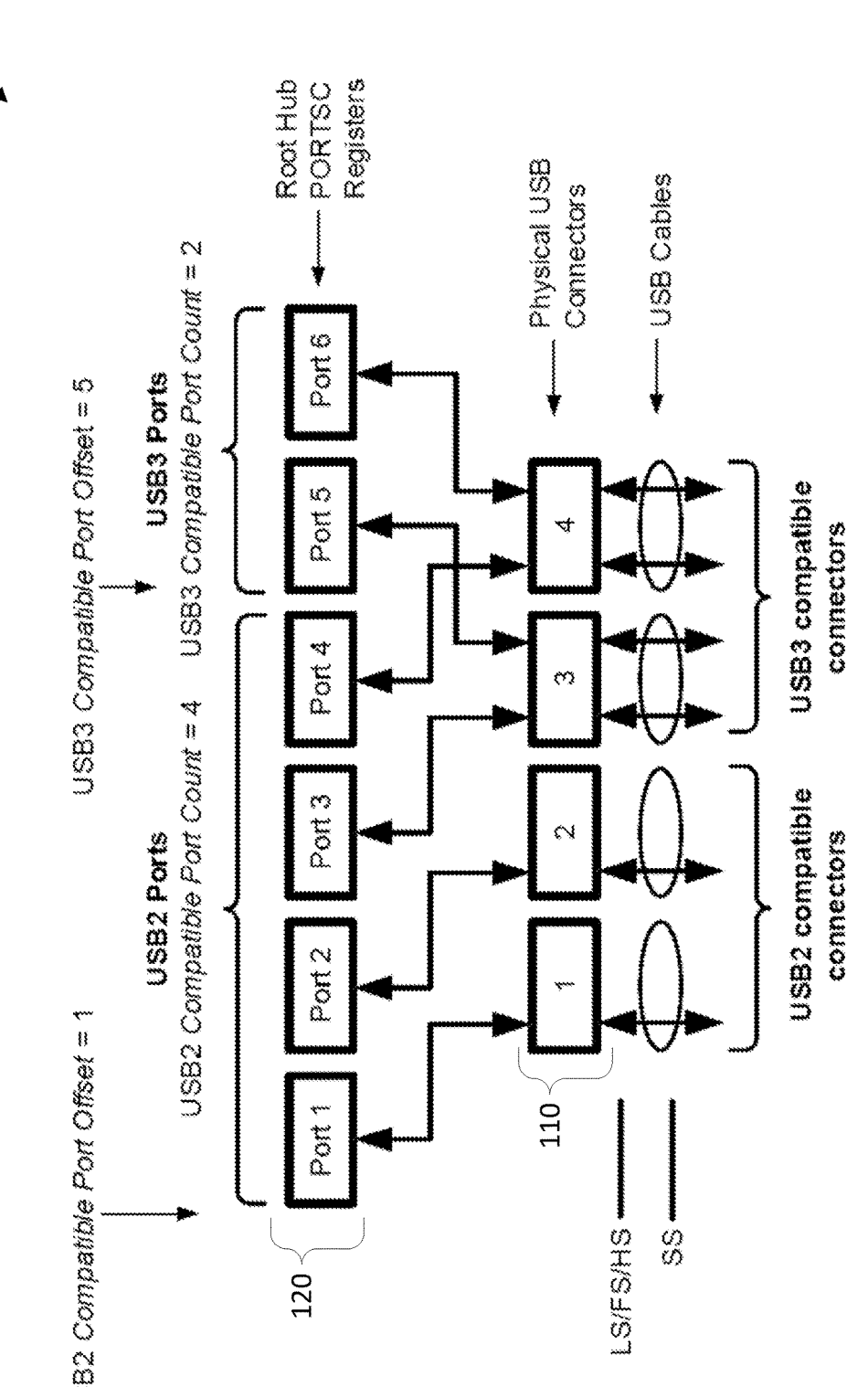
FIG. 1 shows an example relationship, according to the xHCI specification, among ports and connectors that may support USB 2 and USB 3.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, micro-processor, Central Processing Unit (CPU), Graphics Pro-cessing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "soft-ware" refers to any type of executable instruction, including firmware.

Unless explicitly specified, the term "transmit" encom-passes both direct (point-to-point) and indirect transmission (via one or more intermediary points). Similarly, the term "receive" encompasses both direct and indirect reception. Furthermore, the terms "transmit," "receive," "communi-cate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or con-troller in the form of radio signals, where the physical transmission and reception is handled by radio-layer com-ponents such as RF transceivers and antennas, and the logical transmission and reception over the software-level connection is performed by the processors or controllers. The term "communicate" encompasses one or both of trans-mitting and receiving, i.e., unidirectional or bidirectional communication in one or both of the incoming and outgoing directions. The term "calculate" encompasses both 'direct' calculations via a mathematical expression/formula/rela-tionship and 'indirect' calculations via lookup or hash tables and other array indexing or searching operations.

As used herein, the term USB generally refers to the general framework of connectors and protocols for connect-ing to and communicating between USB devices. More specifically, USB 2 (or USB 2.x) generally refers to the Universal Serial Bus Specification, version 2.0, Apr. 27, 2000, published by the USB Implementer's Forum (USB-IF), and revisions thereof. USB 3 (or USB 3.x) generally refers to the Universal Serial Bus Specification 3.2, version 1.0, Sep. 22, 2017, published by the USB-IF, and revisions thereof, and references may be made to more specific versions, such as USB 2.0; USB 3.1; USB 3.2; USB 3.2 Gen 2; etc. As should be understood, the terms USB 2 or USB 3, or the more specific references to USB 3.2, USB 2.0, etc., all refer to data transfer protocols and their supported data rates. The connectors and cables of USB are defined separately, referred to as Standard A/B, Micro B/AB, and Type C, as examples, each of which may support different data transfer protocols and data rates, depending on their type, cabling, and quality.

As noted above, various interoperability interface stan-dards have been drafted to provide a common framework for controlling USB ports and devices, such as the "eXstensible Host Controller Interface for Universal Serial Bus" (xHCI). In recent versions of the USB connector standards, various hardware connectors are described that may be able to deliver USB 3.2 data transfer rates and functionality via Standard A/B, Micro B/AB, and Type C USB connectors. These USB connectors may support the SuperSpeed Plus [USB 3.1 10 Gbps] or SuperSpeed [USB 3.0 5 Gbps] lanes as well as the legacy D+/D-USB 2.x lanes to support the USB 3.x specs. In addition, USB 3.2 adds another set of SuperSpeed Plus lanes. The data rates for SuperSpeed/Plus lanes are 5/10 Gbps while data rates for the USB 2.x lanes are 480/12/1.5 Mbps. Based on the link negotiation between host and device, a maximum data rate may be negotiated for the link.

FIG. 1, excerpted from the xHCI specification and anno-tated, shows an example relationship among ports and connectors that may support USB 2 and USB 3, according to the xHCI specification. As can be seen in FIG. 1, the physical USB connectors 110 may support a mix of different protocols by connecting to multiple different types of ports 120 (USB 2 ports and/or USB 3 ports). As can be seen in FIG. 1, for example, physical USB connectors 110-1 and 110-2 are connected only to USB 2-compatible ports 120 (Port 1 and Port 2). Physical USB connectors 110-3 and 110-4 are connected to both a USB 2-compatible port 120 (Port 3 and Port 4) as well as a USB 3-compatible port 120 (Port 5 or Port 6). This provides dual-compatibility on connector 110-3 and connector 110-4 to support both USB 2 and USB 3, depending on the device and/or cable/con-nector used.

In USB 3, the specification defines a Link Training Status and State Machine ("LTSSM") which may achieve interop-eration between hosts and devices available under the USB 3 ecosystem (e.g., USB 3.2, 3.1, 3.0, etc.). When a device is connected to a host interface, the host controller sends, over the SuperSpeed Plus or SuperSpeed lanes, a receiver detec-tion signal called the "LTSSM Rx.Detect" to discover the presence of receiver termination of the SuperSpeed Plus or SuperSpeed in a compatible device. If a USB 2 device is connected (and therefore not supporting SuperSpeed/Plus), the LTSSM Rx.Detect will fail, the link will be downgraded, and the data communication protocol negotiated according to USB 2 at one of its transfer speeds that are slow than SuperSpeed/Plus.

When a USB 2 device is connected to a connector of the USB interface that supports USB 3 (e.g., in the example of FIG. 1, connector 110-3 or connector 110-4), the USB 3 port (e.g., in the example of FIG. 1, Port 5 or Port 6 of ports 120) begins the negotiation of the data transfer protocol and triggers the LTSSM Rx.Detect circuit and controller. Because the device is a USB 2 device, the LTSSM Rx.Detect of the USB 3 port will fail, and the fallback USB 2 port will attempt to negotiate a USB 2 data transfer protocol and enumerate the USB 2 device according to one of the USB 2 data transfer speeds. Even after the device has been enu-merated as a USB 2 device by the USB 2 port, the USB 3 port continues to send the LTSSM Rx.Detect receiver detec-tion signal.

Discussed in more detail below, the disclosed USB protocol is configured to refrain from sending the LTSSM Rx.Detect receiver detection signal after the device has been enumerated as a USB 2 device by the USB 2 port. In addition, the signal generator that generates the LTSSM Rx.Detect receiver detection signal, the front end Rx.Detect circuits and controllers, and/or the entire USB 3 port may be switched to a low power mode (or off) until the device is disconnected or needs to be re-enumerated by the host controller. Moreover, even if the USB 2 port that enumerated the device is put into a sleep mode (e.g., by a system processor that puts the host into a low power mode because the system is in a "sleep" state), the host need not re-enable the USB 3 (e.g., exit low power mode and begin sending the LTSSM Rx.Detect signal) until re-enumeration is needed. This does not impact the general USB 3 functionality and allows for reducing power of a USB host, which may be directly proportional to the number of connectors that dually support USB 3 and USB 2.

In addition, the disclosed USB protocol handles a situation where USB 3.2 device is downgraded to USB 2 speed enumeration due to USB 3.x speed link training failure. If this occurs, the disclosed USB protocol may potentially wake up on low power mode exit (but not necessarily on a reset exit) to allow for the USB 3.x SuperSpeed/Plus PHY associated circuits and LTSSM to reperform Rx.Detect and retrain to higher speeds. The disclosed USB protocol may choose to not wake and retrain to USB 3.x speeds in order to improve the user experience and for power reduction, as there is a low probability that the retraining will successfully result in higher speeds.

In addition to the potential power savings associated with powering-down some or all of the USB 3 circuitry when a device has been enumerated as a USB 2 device, this may also simplify register transfer level (RTL) design and firmware implementation of port routing and handshake interface across multiple xHCI controllers that are managing USB 2 and USB 3 ports. The disclosed USB protocol may also reduce power in a USB 3 hub tier network.

Figures 2A, 2B, 2C:
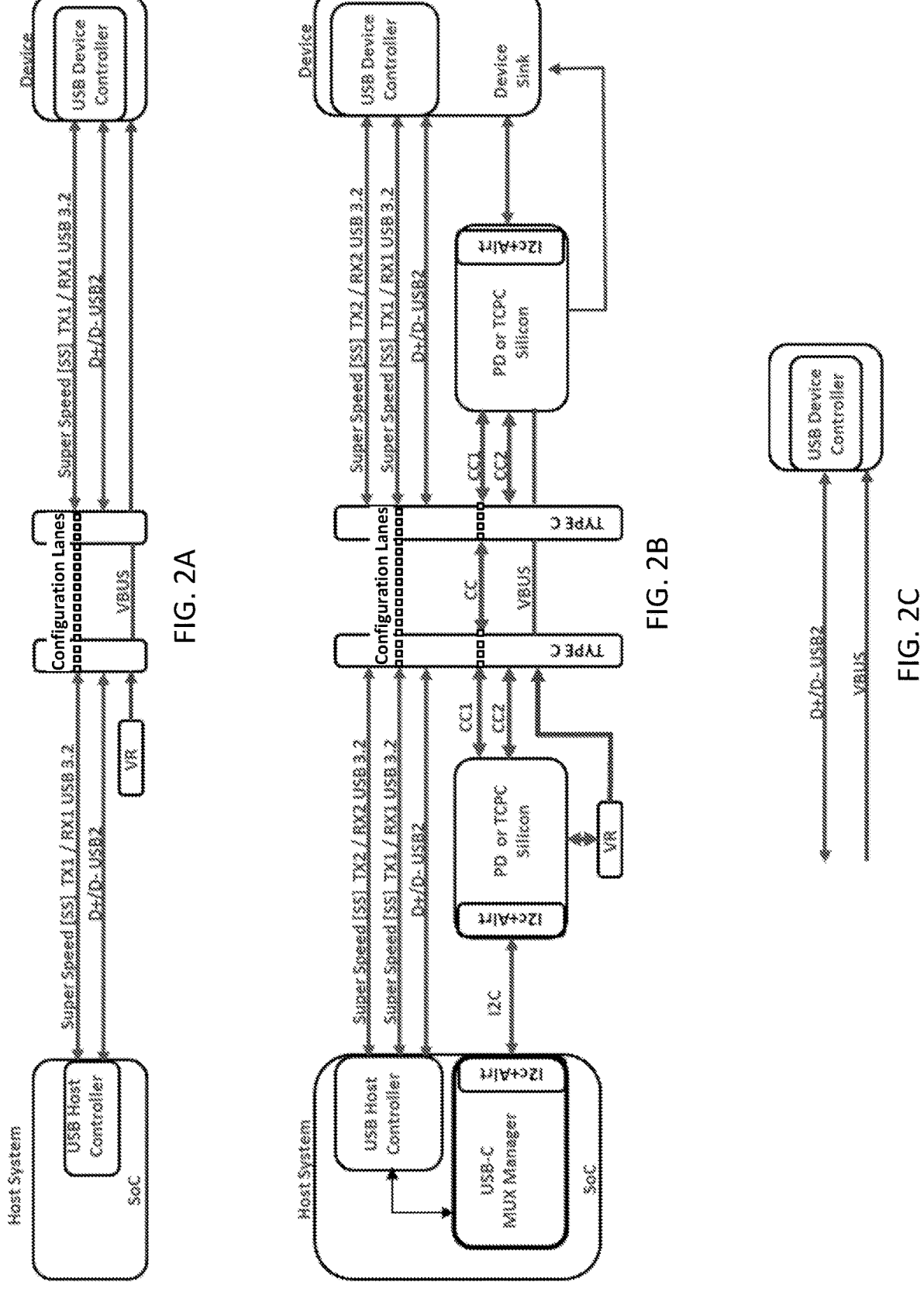
FIG. 2A illustrates an example link between a USB host and a peripheral device using a legacy Type A/B, Micro B/AB connector, over which a USB 3 data connection may be established.
FIG. 2B shows an example link between a USB host and a peripheral device using a Type C connector, which may support, in addition to USB 3.2, other protocols.
FIG. 2C shows an example link to a USB host according to USB 2.

FIGS. 2A, 2B, and 2C each depict an example of the end-to-end connection of a host and peripheral device over various types of links. In particular, FIG. 2A shows a simplified legacy Type A/B, Micro B/AB connector over which the host may establish a USB 3 data connection with a peripheral device. FIG. 2B shows a Type C connector which has other discrete chips to support protocols apart from USB 3.2. With the connectors and connections shown in FIGS. 2A and 2B, the host may use the SuperSpeed Plus lanes to bring the link to 10/5 Gbps and the SuperSpeed lanes to bring the link to 5 Gbps. A USB 3.2 link may support up to 10 Gbps link on two lanes. All of the connector types associated with FIGS. 2A and 2B (e.g., Type A/B, Micro B/AB, and Type C Port) may support legacy USB 2 lanes to operate the link on USB 2 data rates (e.g., high-speed (HS) 480 Mbps, full speed (FS) 12 Mbps, low speed (LS) 1.5 Mbps data rates in cases the SuperSpeed Plus fails to bring the link up to 10 Gbps and further to 5 Gbps. Similarly, if the SuperSpeed lanes fail to train at 5 Gbps, the link may fallback to utilize the USB 2 lanes to bring the link up at lower speeds to enumerate the device as shown in FIG. 2C. A device enumerated under USB 2 may only use the D+/D− lanes and operate at the slower USB 2 data rates unless it is re-enumerated to have a USB 3 data link.

Figure 3:
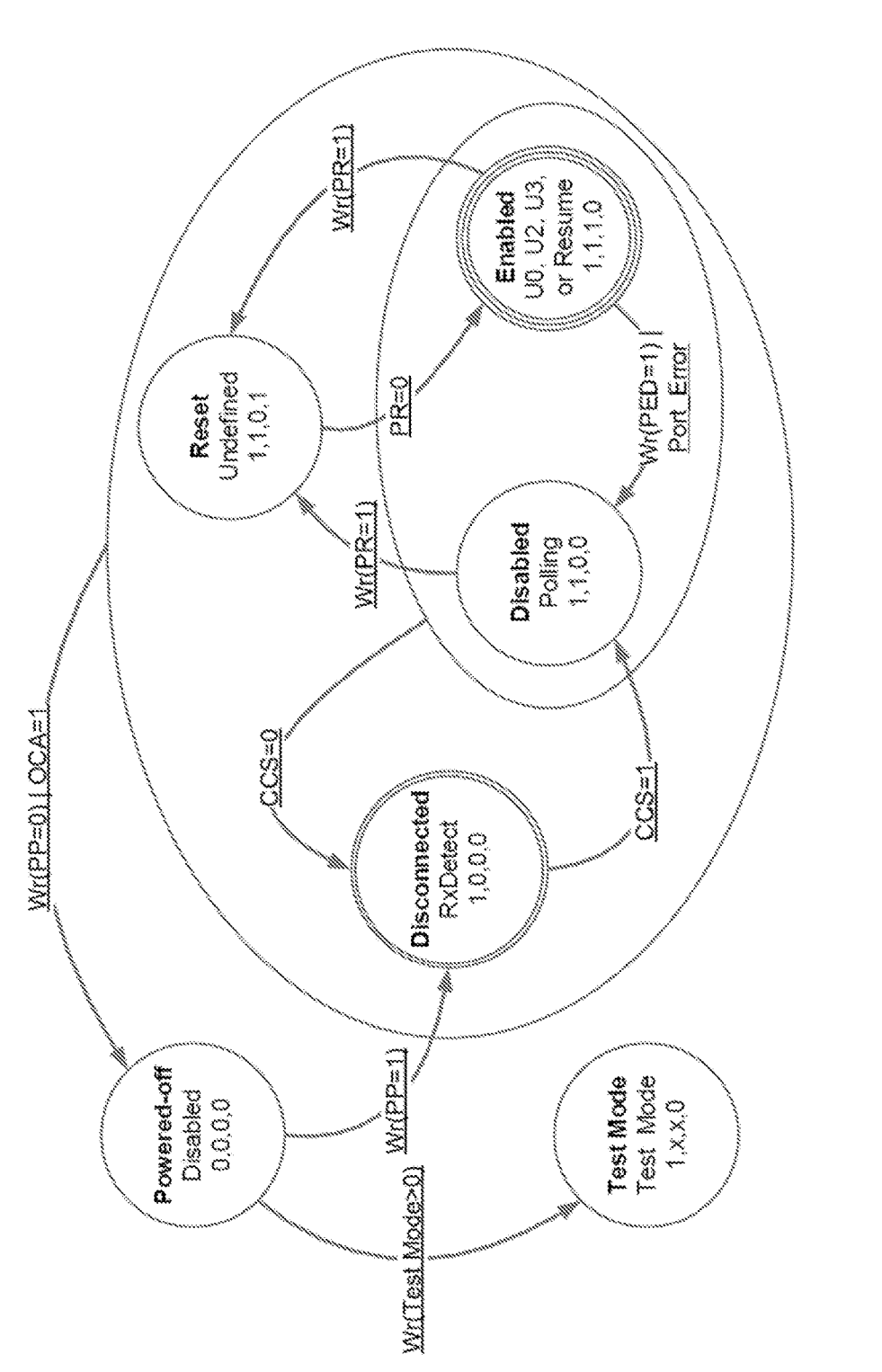
FIG. 3 illustrates an example of top level transitions in a USB 2 protocol root hub state machine of the xHCI standard.
Figure 4:
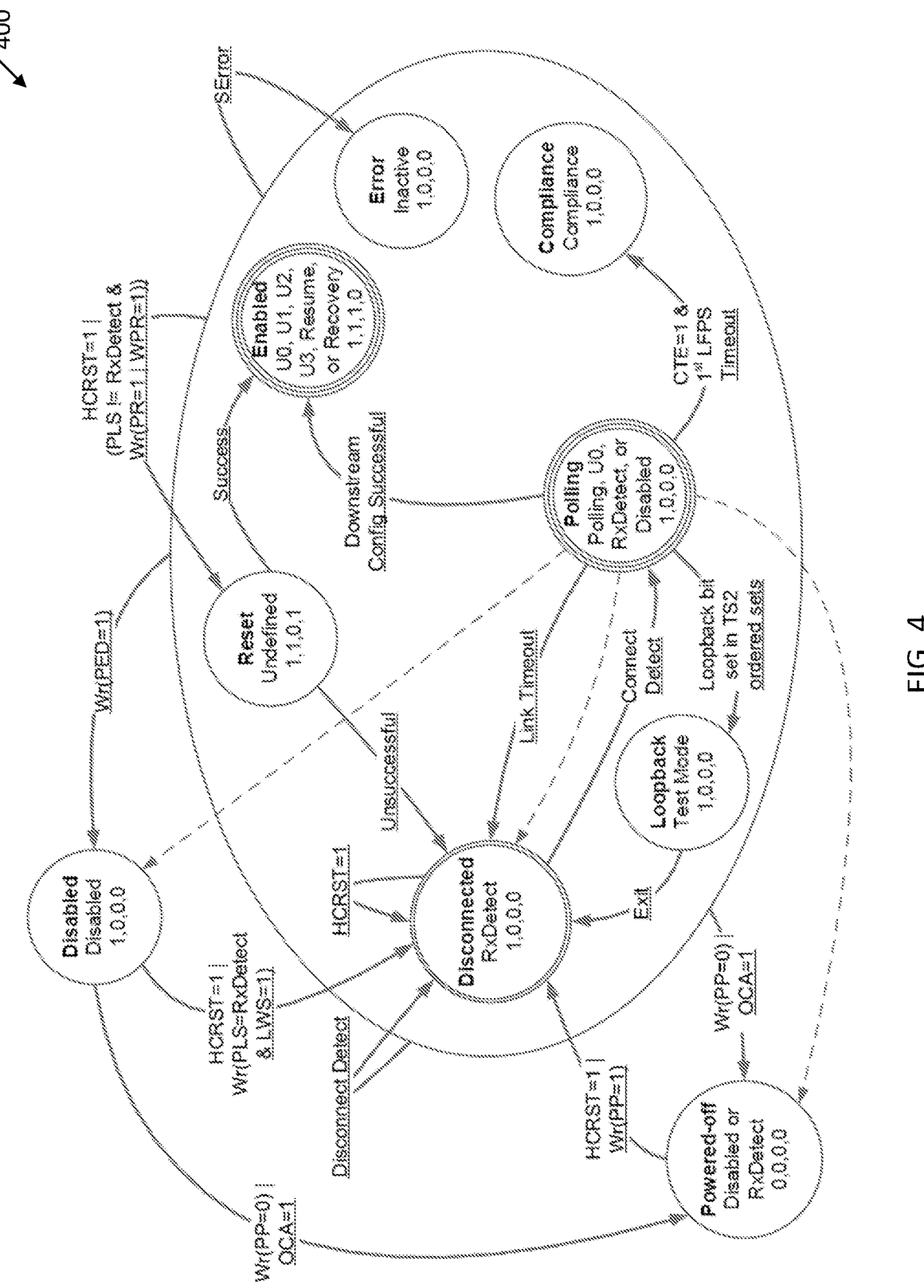
FIG. 4 shows an example of top level transitions in a USB 3 protocol root hub state machine of the xHCI standard.
Figure 5:
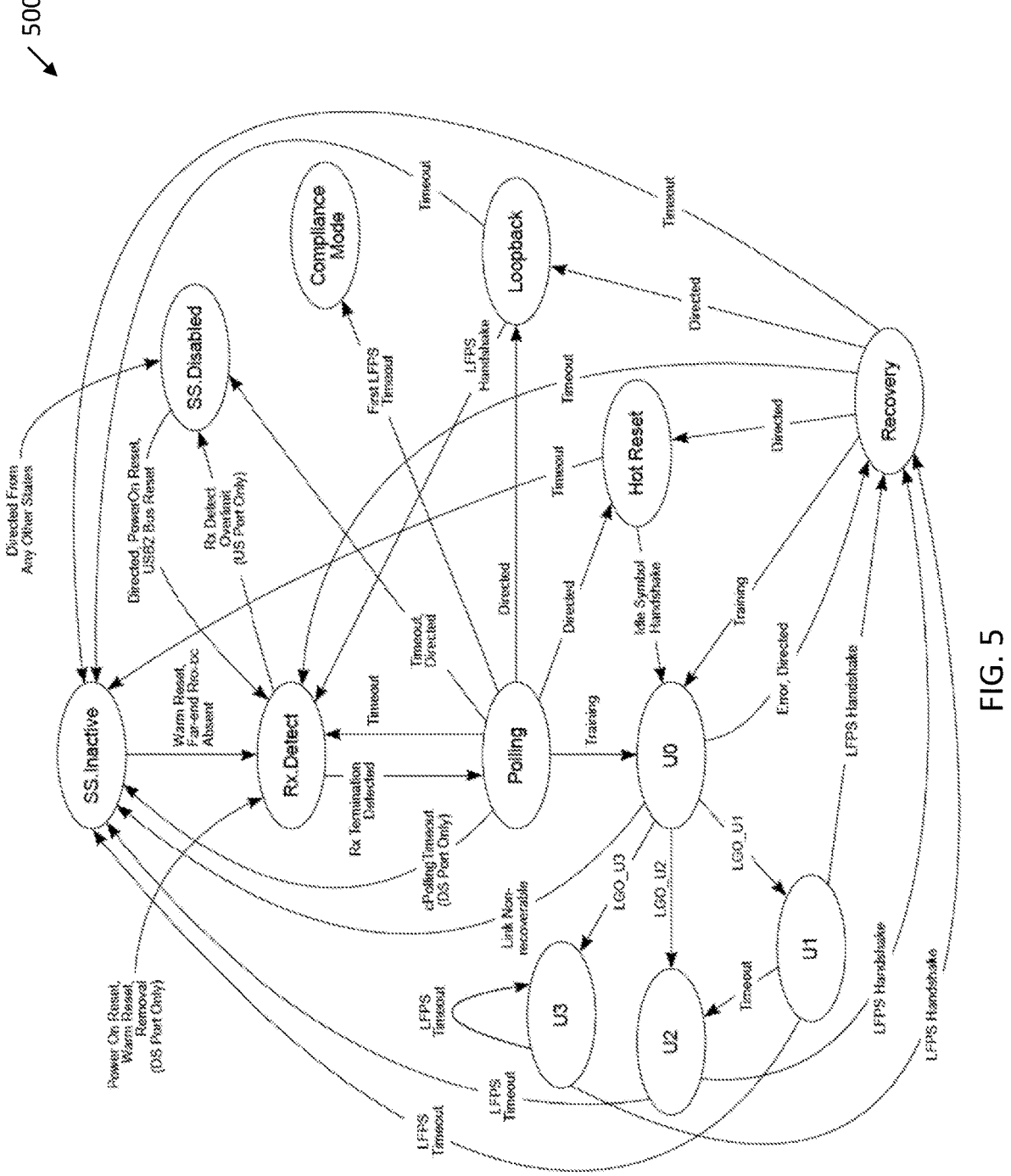
FIG. 5 depicts an example state diagram of the link training and status state machine (LTSSM) from the USB 3 standard.

In the existing USB 2 and USB 3 protocols, root hub ports may follow distinct state machines, examples of which are shown in FIGS. 3, 4, and 5. In particular, FIG. 3 is excerpted from xHCI and shows the top level transitions in a USB 2 protocol root hub state machine, FIG. 4 is excerpted from xHCI and shows the top level transitions in a USB 3 protocol root hub state machine, and FIG. 5 is excerpted from the USB 3.2 standard and shows a state diagram of the link training and status state machine (LTSSM). As noted earlier, a USB 3 connector may support a USB 2 port and a USB 3 port, where the USB 2 port may be present for backward compatibility, having its own root hub with its specific state machine (FIG. 3). The connected device will use only one of the USB 3 port or the USB 2 port at a time (e.g., after enumeration).

When a USB 3 peripheral device is connected to a connector that supports USB 3 (e.g., is connected to USB 3 port), the USB controller moves to the Disconnected state. As soon as VBUS is provided by the host to the connected peripheral device, a Rx.Detect sequence will be started by the peripheral device. A cold attach status is triggered, generating a port status change event when Rx.Detect is completed on the port and thus the state will transition to Polling, as shown in FIG. 4. After a successful polling, the port will transition to the Enabled state and the link enters a UO state, as shown in FIGS. 4 and 5. If the Rx.Detect is not successful (e.g., usually within 80-96 ms) or the polling fails, the host will continue to stay in the Disconnected state and the device will disable its SuperSpeed lanes and downgrade to USB 2 data rates by having the USB 2 port pull up the D+ line to 3.3 V for USB 2 protocol negotiation.

When a USB 2 device is connected to a connector that supports USB 3 (e.g., is connected to both a USB 3 port and also a USB 2 port), the USB 2 port will initiate a move to Disabled state upon detecting the D+ or D− line pulled up to 3.3 volts while failing for Rx.Detect on the USB 3 port. Software will do a port reset which will initiate a port status change event and which will move to Reset state momentarily and finally to Enabled state, as shown in FIG. 3.

In both of the above two described use cases (first, a downgrade to USB 2 when connecting a USB 3 peripheral device due a link failure and second, a USB 2 peripheral device connection that leads to a final USB 2 data rate link enumeration with the USB 2 port while the USB 3 port status is in Disconnect state), according to conventional protocols, the host root hub with Standard A/B, Micro B/AB connectors would continue to have the USB 3 port transmit the Rx.Detect signal every 96 ms, even after the peripheral device has been enumerated as a USB 2 device. When the host root hub has a Type C connector, conventional protocols would continue to send the Rx.Detect receiver detection signals from the USB 3 port for at least 10-15 seconds after USB 2 enumeration and the USB 3 port is again triggered to send the Rx.Detect receiver detection signals every time the host root hub system wakes from a low power mode, even while the USB 2 peripheral device is still connected. This involves a complex system-on-chip/firmware command control communication trigger from a USB 2 port reset "on" event to wake the Type C USB 3 controllers and perform Rx.Detect on USB 3 Superspeed lanes, even when the USB 2 peripheral device is still connected. A system typically wakes at a constant interval of 5-10 seconds from low power mode thus power is consumed every 5-10 seconds. These Rx.Detect signals are redundant, however, because the peripheral device has already been enumerated by and uses the USB 2 port. Indeed, in the case of a system waking up with a USB 3 peripheral device connected that was previously enumerated with a USB 2 link, the host may attempt to re-enumerate the device with an faster link under USB 3, but this may clear the user's workspace and resulting in data loss and is, in any event, unlikely to be successful. Thus, by utilizing the disclosed USB protocol that refrains from sending the Rx.Detect receiver detection signals after they are first sent (e.g., after enumerating the peripheral device as a USB 2 device), circuits of or the entire USB 3 port may be powered down, simplifying design and firmware implementation across the SoC controller interface.

Figure 6:
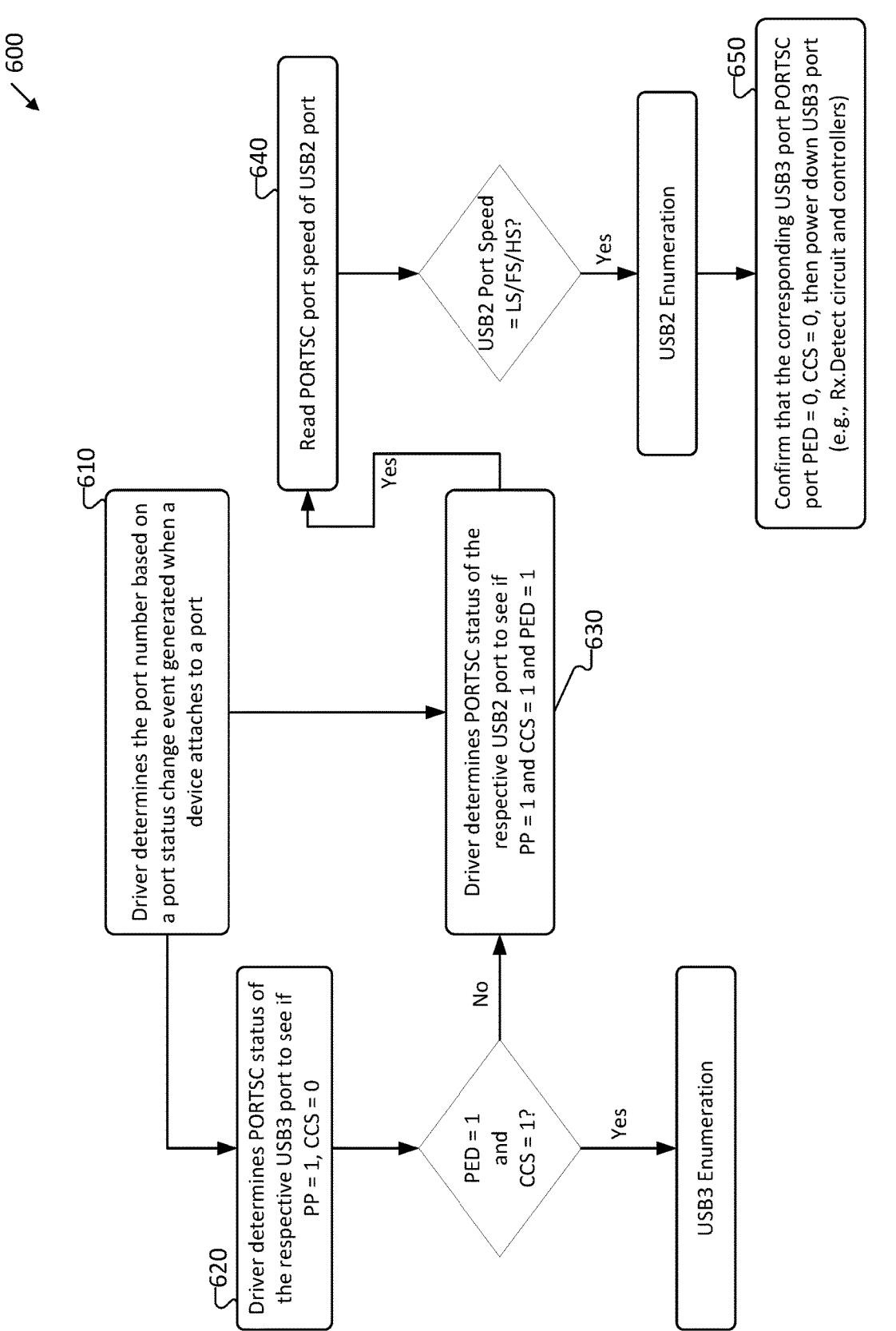
FIG. 6 depicts an example flow by which a USB driver and firmware may refrain from sending receiver detection signals and/or powering down some or all of the USB 3 port.

Both USB 3 and USB 2 have port status registers and port event changes that may be propagated to software (e.g., the operating system of a computer/device utilizing the USB controller) through interrupts and power management events. To determine when to refrain from sending the receiver detection signals and/or to power-down the USB 3 port, the software may read the status register associated with the port status. FIG. 6, for example, shows a flow 600 by which a USB driver and firmware may, using the disclosed USB protocol, discover whether the connected peripheral device operating under a USB 2 link is (1) a USB 2 device or (2) a USB 3 device that has been downgraded to a USB 2 link, and as a result, refrain from sending the Rx.Detect receiver detection signals and/or powering down some or all of the USB 3 port.

In the example implementation of FIG. 6, after the driver determines, in 610, to which port a new peripheral device has been attached (e.g., through a status change event) the USB 3 driver may, in 620 read register bits (xHCI PORTSC.PED [Port Enabled/Disabled], PORTSC.CCS [Current Connect Status]) to confirm the correct port number for the connector on which the peripheral device is attached. When these register bits are set (PED=1 and CCS=1), the USB 3 link has been successfully trained and the peripheral device has been enumerated as a USB 3 device. If the USB 3 link has training failed (PED #1 or CCS 1), USB 2 terminations are exposed on D+/D-signals. This starts the USB 2 driver to enumerate the link to a USB 2 speed (e.g., LS/FS/HS). The USB 2 compatible xHCI will set the PORTSC.PP, PORTSC.CCS and PORTSC.PED register bits to =1 and the driver may, in 630, determine the status of these bits. The driver and firmware may then, in 640, read the PORTSC.PortSpeed register bits associated with the port speed of the USB 2 port to confirm a successful USB 2 enumeration.

Once a USB 2 link is successfully established and confirmed, the USB 2 driver may, in 650, reconfirm that its corresponding USB 3 port is not enabled (e.g., via the PORTSC.PED register bit) and that the connect status is not updated (e.g., via the PORTSC.CCS register bit). This ensures that the USB 3 link is not active and allows the USB 2 driver to disable the Rx.Detect circuit for its corresponding USB 3 port. As should be appreciated, this is merely an example implementation, and the drivers may use any type of flags, messages, or registers to discover the type of peripheral device connected and, as a result, stop transmitting the Rx.Detect receiver detection signals and/or to power-down the USB 3 port.

Figure 7:
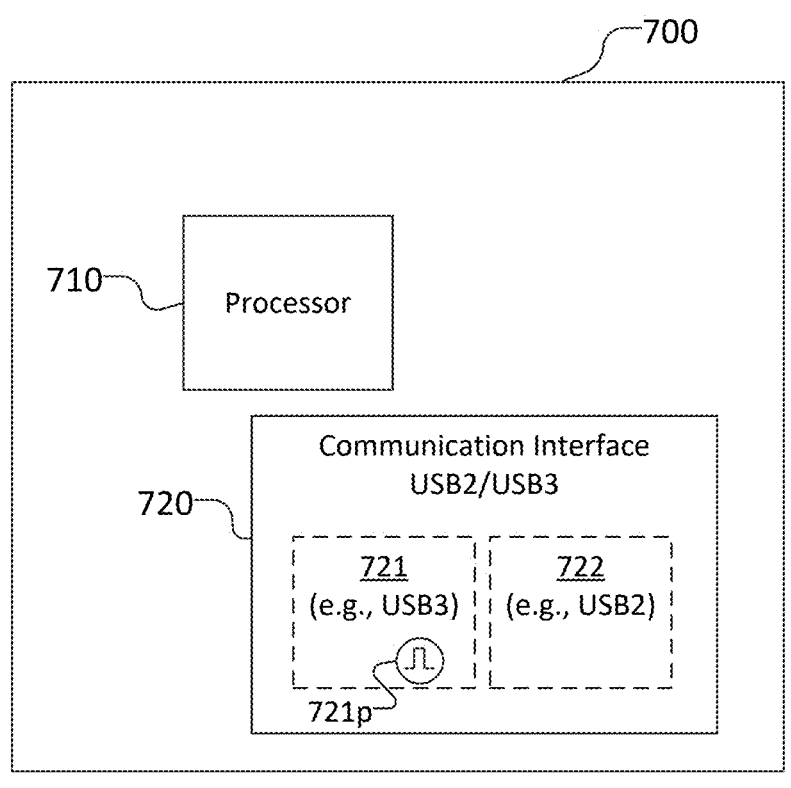
FIG. 7 illustrates an exemplary schematic drawing of a device for refraining from sending receiver detection signals in a USB system.

FIG. 7 is a schematic drawing illustrating a device 700 for refraining from sending receiver detection signals in a USB system. The device 700 may include any of the features with respect to the implementations of the USB protocols discussed above and any of FIGS. 1-6. FIG. 7 may be implemented as a device, a system, a method, and/or a computer readable medium that, when executed, performs the features of the USB protocols described above. It should be understood that device 700 is only an example, and other configurations may be possible that include, for example, different components or additional components.

Device 700 includes a processor 710 and a communication interface 720. Communication interface 720 is configurable to communicate in a first universal serial bus (USB) communication mode or a second USB communication mode. Processor 710 is configurable to send receiver detection signals to a peripheral device over communication interface 720 to determine whether the peripheral device is capable of communicating in the first USB communication mode (e.g., a USB 3 communication mode (e.g., SuperSpeed or SuperSpeed Plus)), wherein processor 710 may be configured to send an initial signal of the receiver detection signals to the peripheral device and, if a response to the initial signal of the receiver detection signals indicates that the peripheral device is incapable of operating in the first USB communication mode, refrain from sending subsequent ones of the receiver detection signals.

Furthermore, in addition to or in combination with any of the features described in this or the preceding paragraph with respect to device 700, the receiver detection signals may be transmitted to the peripheral device during a negotiation procedure for establishing a set of communication parameters for communicating with the peripheral device over communication interface 720. Furthermore, in addition to or in combination with any of the features described in this or the preceding paragraph, processor 710 may be configured to refrain from sending the subsequent ones of the receiver detection signals based on the set of communication parameters. Furthermore, in addition to or in combination with any of the features described in this or the preceding paragraph, the established set of communication parameters may define a communication mode supported by the peripheral device connected to communication interface 720. Furthermore, in addition to or in combination with any of the features described in this or the preceding paragraph, the established set of communication parameters may define whether communication interface 720 is configured to operate in the first USB communication mode.

Furthermore, in addition to or in combination with any of the features described in this or the preceding two paragraphs with respect to device 700, the negotiation procedure may include a USB enumeration. Furthermore, in addition to or in combination with any of the features described in this or the preceding two paragraphs, the first USB communication mode may be associated with a USB 3 enumeration of the peripheral device to operate in the first USB communication mode, wherein the second USB communication mode may be associated with a USB 2 enumeration of the peripheral device to operate in the second USB communication mode. Furthermore, in addition to or in combination with any of the features described in this or the preceding two paragraphs, after processor 710 has configured communication interface 720 to communicate with the peripheral device in the second USB communication mode, processor 710 may be configured to refrain from sending subsequent ones of the receiver detection signals.

Furthermore, in addition to or in combination with any of the features described in this or the preceding three paragraphs with respect to device 700, after processor 710 has downgraded communication interface 720 from communicating with the peripheral device in the first USB communication mode to communicating with the peripheral device in the second USB communication mode, processor 710 may be configured to refrain from sending subsequent ones of the receiver detection signals. Furthermore, in addition to or in combination with any of the features described in this or the preceding three paragraphs, communication interface 720 may include a first communication controller 721 configured to operate communication interface 720 in the first USB communication mode. Furthermore, in addition to or in combination with any of the features described in this or the preceding three paragraphs, communication interface 720 may also include a second communication controller 722 configured to operate communication interface 720 in the second USB communication mode, wherein processor 710 may be configured to power down the first communication controller 721 after processor 710 has configured communication interface 720 to communicate with the peripheral device in the second USB communication mode.

Furthermore, in addition to or in combination with any of the features described in this or the preceding four paragraphs, the first communication controller 721 may include a USB 3 controller, wherein the second communication controller 722 may include a USB 2 controller. Furthermore, in addition to or in combination with any of the features described in this or the preceding four paragraphs, processor 710 configured to power down the first communication controller 721 may include processor 710 configured to disable a pulse generator 721*p* of the receiver detection signal in the first communication controller 721. Furthermore, in addition to or in combination with any of the features described in this or the preceding four paragraphs, processor 710 configured to power down the first communication controller 721 may include processor 710 configured to disable a supply voltage to the first communication controller. Furthermore, in addition to or in combination with any of the features described in this or the preceding four paragraphs, processor 710 may be a USB controller configured to control communication interface 720 according to a USB protocol.

Furthermore, in addition to or in combination with any of the features described in this or the preceding five paragraphs with respect to device 700, wherein communication interface 720 may be a USB interface that includes a USB connector. Furthermore, in addition to or in combination with any of the features described in this or the preceding five paragraphs, device 700 may also include a USB host root port or a USB hub. Furthermore, in addition to or in combination with any of the features described in this or the preceding five paragraphs, processor 720 may include a USB controller. Furthermore, in addition to or in combination with any of the features described in this or the preceding five paragraphs, the first USB communication mode may include a USB 3 protocol. Furthermore, in addition to or in combination with any of the features described in this or the preceding five paragraphs, the first USB communication mode may include a SuperSpeed or a SuperSpeed Plus communication mode of the USB 3 protocol. Furthermore, in addition to or in combination with any of the features described in this or the preceding five paragraphs, the second USB communication mode may include a USB 2 protocol.

Figure 8:
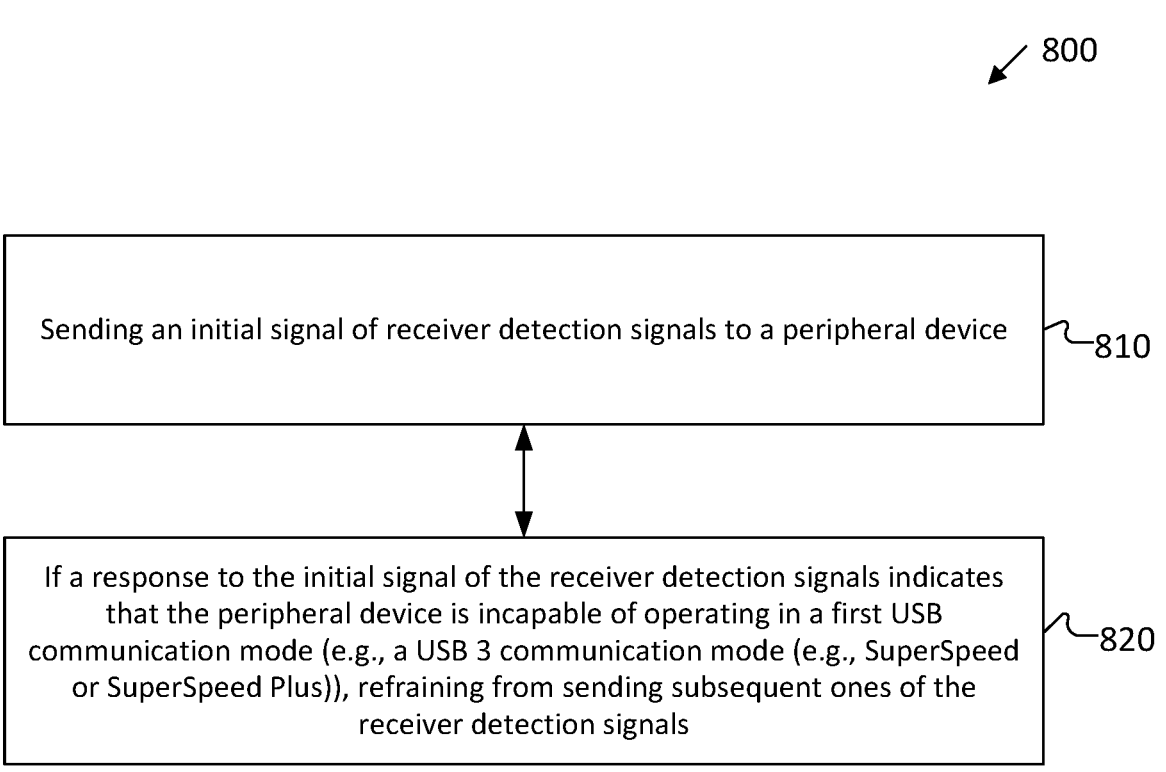
FIG. 8 depicts an exemplary schematic flow diagram of a method for refraining from sending receiver detection signals in a USB system.

FIG. 8 depicts a schematic flow diagram of a method 800 for refraining from sending receiver detection signals in a USB system. Method 800 may implement any of the any of the features with respect to the implementations of the USB protocols discussed above and any of FIGS. 1-7. Method 800 includes, in 810, sending an initial signal of receiver detection signals to a peripheral device. Method 800 also includes, in 820, if a response to the initial signal of the receiver detection signals indicates that the peripheral device is incapable of operating in a first USB communication mode (e.g., a USB 3 communication mode (e.g., SuperSpeed or SuperSpeed Plus)), refraining from sending subsequent ones of the receiver detection signals.

In the following, various examples are provided that may include one or more features described with reference to the USB protocols discussed above, and in particular, refraining from sending receiver detection signals, and any of FIGS. 1-8. The examples provided in relation to the devices may apply also to the described method(s), and vice versa.

Example 1 is device including a communication interface that is configurable to communicate in a first universal serial bus (USB) communication mode (e.g., a USB 3 communication mode (e.g., SuperSpeed or SuperSpeed Plus)) or a second USB communication mode (e.g., a USB 2 communication mode (e.g., LS, FS, HS)). The device also includes a processor configurable to send receiver detection signals to a peripheral device over the communication interface to determine whether the peripheral device is capable of communicating in the first USB communication mode, wherein the processor is configured to send an initial signal of the receiver detection signals to the peripheral device and, if a response to the initial signal of the receiver detection signals indicates that the peripheral device is incapable of operating in the first USB communication mode, refrain from sending subsequent ones of the receiver detection signals.

Example 2 is the device of example 1, wherein the receiver detection signals are transmitted to the peripheral device during a negotiation procedure for establishing a set of communication parameters for communicating with the peripheral device over the communication interface.

Example 3 is the device of any one of examples 1 to 2, wherein the processor is configured to refrain from sending the subsequent ones of the receiver detection signals based on the set of communication parameters.

Example 4 is the device of any one of examples 1 to 3, wherein the established set of communication parameters defines a communication mode supported by the peripheral device connected to the communication interface.

Example 5 is the device of any one of examples 1 to 4, wherein the established set of communication parameters defines whether the communication interface is configured to operate in the first USB communication mode.

Example 6 is the device of any one of examples 1 to 5, wherein the negotiation procedure includes a USB enumeration.

Example 7 is the device of any one of examples 1 to 6, wherein the first USB communication mode is associated with a USB 3 enumeration of the peripheral device to operate in the first USB communication mode, wherein the second USB communication mode is associated with a USB 2 enumeration of the peripheral device to operate in the second USB communication mode.

Example 8 is the device of any one of examples 1 to 7, wherein after the processor has configured the communication interface to communicate with the peripheral device in the second USB communication mode, the processor is configured to refrain from sending subsequent ones of the receiver detection signals.

Example 9 is the device of any one of examples 1 to 8, wherein after the processor has downgraded the communication interface from communicating with the peripheral device in the first USB communication mode to communicating with the peripheral device in the second USB communication mode, the processor is configured to refrain from sending subsequent ones of the receiver detection signals.

Example 10 is the device of any one of examples 1 to 9, wherein the peripheral device comprises a USB 2 device without a USB 3 receiver termination circuit.

Example 11 is the device of any one of examples 1 to 10, wherein the peripheral device comprises a USB 3 peripheral device that fails to correctly respond to the receiver detection signal (e.g., due to improper connection, poor design, poor connection, etc.).

Example 12 is the device of any one of examples 1 to 11, wherein the communication interface includes a first communication controller configured to operate the communication interface in the first USB communication mode. The communication interface also includes a second communication controller configured to operate the communication interface in the second USB communication mode, wherein the processor is configured to power down the first communication controller after the processor has configured the communication interface to communicate with the peripheral device in the second USB communication mode.

Example 13 is the device of example 12, wherein the first communication controller includes a USB 3 controller, wherein the second communication controller includes a USB 2 controller.

Example 14 is the device of any one of examples 12 to 13, wherein the processor configured to power down the first communication controller includes the processor configured to disable a pulse generator of the receiver detection signal in the first communication controller.

Example 15 is the device of any one of examples 12 to 14, wherein the processor configured to power down the first communication controller includes the processor configured to disable a supply voltage to the first communication controller.

Example 16 is the device of any one of examples 1 to 15, wherein the processor is a USB controller configured to control the communication interface according to a USB protocol.

Example 17 is the device of any one of examples 1 to 16, wherein the communication interface is a USB interface that includes a USB connector.

Example 18 is the device of any one of examples 1 to 17, wherein the device includes a USB host root port or a USB hub.

Example 19 is the device of any one of examples 1 to 18, wherein the processor includes a USB controller.

Example 20 is the device of any one of examples 1 to 19, wherein the first USB communication mode includes a USB 3 protocol.

Example 21 is the device of example 20, wherein the first USB communication mode includes a SuperSpeed (e.g., 5 Gbps) or a SuperSpeed Plus (e.g., 10 Gbps) communication mode of the USB 3 protocol.

Example 22 is the device of any one of examples 1 to 21, wherein the second USB communication mode includes a USB 2 protocol (e.g., at low speed (LS) (1.5 Mbps), full speed (FS) (12 Mbps), high speed (HS) (480 Mbps)).

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising:

a communication interface that is configurable to communicate in a first universal serial bus (USB) communication mode or a second USB communication mode, wherein the first USB communication mode comprises a USB 3 protocol and the second USB communication mode comprises a USB 2 protocol; and a processor configurable to send receiver detection signals to a peripheral device over the communication interface to determine whether the peripheral device is capable of communicating in the first USB communication mode, wherein the processor is configured to send an initial signal of the receiver detection signals to the peripheral device and, if a response to the initial signal of the receiver detection signals indicates that the peripheral device is incapable of operating in the first USB communication mode, refrain from sending subsequent ones of the receiver detection signals.

2. The device of claim 1, wherein the receiver detection signals are transmitted to the peripheral device during a negotiation procedure for establishing a set of communication parameters for communicating with the peripheral device over the communication interface.

3. The device of claim 2, wherein the processor is configured to refrain from sending the subsequent ones of the receiver detection signals based on the set of communication parameters.

4. The device of claim 2, wherein the set of communication parameters defines a communication mode from among the first USB communication mode and the second USB communication mode supported by the peripheral device connected to the communication interface.

5. The device of claim 2, wherein the set of communication parameters defines whether the communication interface is configured to operate in the first USB communication mode.

6. The device of claim 2, wherein the negotiation procedure comprises a USB enumeration.

7. The device of claim 1, wherein the first USB communication mode is associated with a USB 3 enumeration of the peripheral device to operate in the first USB communication mode, wherein the second USB communication mode is associated with a USB 2 enumeration of the peripheral device to operate in the second USB communication mode.

8. The device of claim 1, wherein after the processor has configured the communication interface to communicate with the peripheral device in the second USB communication mode, the processor is configured to refrain from sending subsequent ones of the receiver detection signals.

9. The device of claim 1, wherein after the processor has downgraded the communication interface from communicating with the peripheral device in the first USB communication mode to communicating with the peripheral device in the second USB communication mode, the processor is configured to refrain from sending subsequent ones of the receiver detection signals.

10. The device of claim 1, wherein the communication interface comprises:

a first communication controller configured to operate the communication interface in the first USB communication mode; and a second communication controller configured to operate the communication interface in the second USB communication mode, wherein the processor is configured to power down the first communication controller after the processor has configured the communication interface to communicate with the peripheral device in the second USB communication mode.

11. The device of claim 10, wherein the first communication controller comprises a USB 3 controller, wherein the second communication controller comprises a USB 2 controller.

12. The device of claim 10, wherein the processor configured to power down the first communication controller comprises the processor configured to disable a pulse generator of the receiver detection signal in the first communication controller.

13. The device of claim 10, wherein the processor configured to power down the first communication controller comprises the processor configured to disable a supply voltage to the first communication controller.

14. An apparatus comprising:

a means for communicating in a first communication mode or a second communication mode; and a means for sending receiver detection signals to a peripheral device using the means for communicating, wherein the receiver detection signals are to determine whether the peripheral device is capable of communicating in the first communication mode, wherein the first communication mode comprises a USB 3 protocol, wherein the second communication mode comprises a USB 2 protocol;

a means for sending an initial signal of the receiver detection signals to the peripheral device; and a means for refraining from sending subsequent ones of the receiver detection signals to the peripheral device if a response to the initial signal of the receiver detection signals indicates that the peripheral device is incapable of operating in the first communication mode.

15. The apparatus of claim 14, wherein the apparatus is a USB controller configured to control the means for communication according to a USB protocol, wherein the second communication mode is according to a USB 2 data transfer mode and the first communication mode is according to a USB 3 data transfer mode.

16. A non-transitory, computer-readable medium comprising instructions that, when executed by one or more processors, cause the one or more processors to:

send receiver detection signals to a peripheral device over a communication interface to determine whether the peripheral device is capable of communicating in a first universal serial bus (USB) communication mode or a second USB communication mode, wherein the first USB communication mode comprises a USB 3 protocol, wherein the second USB communication mode comprises a USB 2 protocol;

send an initial signal of the receiver detection signals to the peripheral device; and refrain from sending subsequent ones of the receiver detection signals if a response to the initial signal of the receiver detection signals indicates that the peripheral device is incapable of operating in the first USB communication mode.

17. The non-transitory, computer-readable medium of claim 16, wherein the communication interface is a USB interface that comprises a USB connector.

18. The non-transitory, computer-readable medium of claim 16, wherein the first USB communication mode comprises a SuperSpeed or a SuperSpeed Plus communication mode of the USB 3 protocol.

\* \* \* \* \*